(12) United States Patent
Grgic et al.

(10) Patent No.: US 12,049,356 B2
(45) Date of Patent: Jul. 30, 2024

(54) METHOD, DEVICE, AND SYSTEM TO QUANTIFY WASTE AT THE BIN-LEVEL

(71) Applicant: BINIT OY/LTD, Helsinki (FI)

(72) Inventors: Borut Grgic, Ljubljiana (SI); Pasi Makkonen, Lisbon (PT)

(73) Assignee: BINIT OY/LTD, Helsinki (FI)

( * ) Notice: Subject to any disclaimer, the term of this patent is extended or adjusted under 35 U.S.C. 154(b) by 0 days.

(21) Appl. No.: 18/109,361

(22) Filed: Feb. 14, 2023

(65) Prior Publication Data
US 2023/0257193 A1   Aug. 17, 2023

Related U.S. Application Data

(60) Provisional application No. 63/309,947, filed on Feb. 14, 2022.

(51) Int. Cl.
*B65F 1/14* (2006.01)

(52) U.S. Cl.
CPC ...... *B65F 1/1484* (2013.01); *B65F 2210/128* (2013.01); *B65F 2210/138* (2013.01); *B65F 2210/168* (2013.01); *B65F 2210/182* (2013.01); *B65F 2210/184* (2013.01)

(58) Field of Classification Search
CPC .............. B65F 1/1484; B65F 2210/128; B65F 2210/138; B65F 2210/168; B65F 2210/182; B65F 2210/184
See application file for complete search history.

(56) References Cited

U.S. PATENT DOCUMENTS

| | | | |
|---|---|---|---|
| 2020/0010270 A1 | 1/2020 | Bourn et al. | |
| 2020/0369468 A1* | 11/2020 | Searle | G01S 17/06 |
| 2021/0217156 A1* | 7/2021 | Balachandran | G06T 7/0008 |
| 2021/0371196 A1 | 12/2021 | Krishnamurthy et al. | |
| 2022/0044208 A1* | 2/2022 | Borowski | B65F 1/1484 |

OTHER PUBLICATIONS

Noam Scheiber, "How Uber Uses Psychological Tricks to Push Its Drivers' Buttons", Apr. 2, 2017, New York Times (Year: 2017).*
Extended European Search Report received in 23156282.8 dated Jul. 4, 2023, pp. 8.

* cited by examiner

*Primary Examiner* — Jacob S. Scott
*Assistant Examiner* — Miraj T. Patel
(74) *Attorney, Agent, or Firm* — Liang & Hennessey LLP; Brian Hennessey

(57) ABSTRACT

A method includes receiving data from a device, the data includes at least a first amount of a first type of waste. The method includes comparing the data with a profile including historical waste data from a location, and sending notifications to the device based on the comparing operation. The notifications include information relating to the data and the profile. The device communicates the notifications to a user. The method may include receiving first goals from the device, and determining second goals based on community waste averages. The profile may include the first goals and the second goals. The method may include sending recommendations to the device based at least in part on the data and the profile. An exemplary device includes at least one sensor associated with a waste receptacle, which may be a computer vision imaging sensor.

15 Claims, 10 Drawing Sheets

600A

METHOD, DEVICE, AND SYSTEM TO QUANTIFY WASTE AT THE BIN-LEVEL

CROSS-REFERENCE TO RELATED APPLICATIONS

The present application claims priority to Provisional Patent Application No. 63/309,947, filed Feb. 14, 2022, entitled "DEVICE TO QUANTIFY HOUSEHOLD WASTE AT THE BIN-LEVEL", which is incorporated by reference in its entirety.

BACKGROUND

1. Field of the Invention

The present disclosure relates generally to embedded or standalone devices and, more specifically, to devices for quantifying waste at a per-bin level.

2. Description of the Related Art

Waste generation and the subsequent accumulation thereof is a problem on a global scale. Most people are conceptually aware that the waste they generate can cause a negative environmental impact. Indeed, many people desire to generate less waste and some even attempt to make efforts to reduce waste. However, those people often rely on actions that they think are best based on minimal information or incorrect assumptions. In many cases, the only feedback people receive on their actions is at a high-level (e.g., community, city or regional feedback) and long after the fact.

In some cases, public (or private) waste services may publish quarterly or yearly waste metrics for a service area or region. Additionally, a waste service may publish a bulletin to inform users within a service area or region about procedures or recommendations for separating waste (e.g., recyclable or compostable materials from other trash). The high-level metrics, even when provided to people within a service area or region, are insufficient to inform people as to how following a procedure or recommendation actively reduces the amount of waste they individually produce, and the impact of that waste on the environment. Moreover, the procedures or recommendations are often forgotten, or too general, and in either case are disconnected from the impact of waste produced (or reduced) at the point in time when an individual chooses whether to perform an action.

SUMMARY OF THE INVENTION

The following is a non-exhaustive listing of some aspects of the present techniques. These and other aspects are described in the following disclosure.

A method to continuously capture signal data from one or more sensors, process the measurements, and store results of the processing to a memory. The one or more sensors may include one or more weight sensors, computer vision imaging sensors, visual sensor, ultrasonic sensor, chemical sensor, or other sensors for determining properties about waste generated by a household. References to household in this application may refer to any customer location, for example, an office, any institution, a school, a hospital, a campus, etc. One or more sensors may be associated with a waste receptacle to capture signal data, like measurement data including one or more measurements, images, or the like, indicative of the waste added to the receptacle. The sensors may transmit captured signal data for processing, which in some examples may be processed by a local device. For example, the local device may determine properties of waste added to a receptacle based on the measurement data obtained from the one or more sensors associated with the waste receptacle. In some examples, the local device may transmit information about the data obtained from the sensors or results determined based on processing the data obtained from the sensors to a remote server. Some embodiments may determine a profile, which may be referred to herein as a household profile, and which may be a profile of a household, an office, institution, school, hospital, campus or other customer location. The profile may be based on properties of waste added over time to one or more receptacles tracked by the local device, to estimate the daily average to then provide feedback to the user about target settings. The local device may communicate with the remote server to update artificial intelligence and machine learning models by which captured sensor data may be processed. In some examples, the models may process other data, such as to determine target based goals, determine notifications, and determine other feedback or recommendations based at least in part on captured signal data and the household profile. The local device or remote server may use data processing and statistical analysis models to classify waste, such as by properties determined from measurements like weight, volume, etc., by type/composition to determine amounts of different types of waste generated. In some examples, the remote server may store and update user profiles and determine notifications or other feedback to inform a user or household about the waste generated. In some examples, the notifications may inform a user temporally proximate to the addition of waste placed in a receptacle as to whether the waste added to the receptacle should be placed (wholly or partially) in another receptacle (e.g., for receiving a specific type/composition of waste) to improve mis-categorization of waste destined for bulk waste processing (e.g., recycling), or to indicate to a user that certain the waste is compostable.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

Exemplary embodiments of the present invention provide a method that includes receiving data from a device. The data includes at least a first amount of a first type of waste. The method also includes comparing the data with a profile including historical waste data from a location, and sending notifications to the device based on the comparing operation. The notifications include information relating to the data and the profile. The device is configured to communicate the notifications to a user.

The method may include receiving first goals from the device, and determining second goals based on community waste averages. The profile may include the first goals and the second goals.

In the method, the comparing may include comparing the first amount to the first goal. The notifications may include information tracking a first progress towards the first goal. The comparing may also include comparing the first amount to the second goal. The notifications may include information tracking a second progress towards the second goal. The notifications may include positive feedback prompts for waste reduction and/or awards for waste reduction.

The historical waste data may include a daily average, and the comparing operation may include comparing the data and the daily average.

The method may include sending recommendations to the device based at least in part on the data and the profile. The device may be configured to communicate the notifications and the recommendations to the user by at least one of a display, a speaker, and a wireless connection to a mobile device. The method may include sending the notifications to an application running on a mobile device of the user.

An exemplary device according to the present technology includes at least one sensor associated with a waste receptacle. The at least one sensor is configured to determine properties of waste added to the waste receptacle. The exemplary device includes a processor configured to receive measurement data from the at least one sensor and configured to analyze the measurement data. The exemplary device includes a display, a speaker, and/or a wireless connection to a mobile device configured to provide information to a user, the information being based on the measurement data obtained from the at least one sensor associated with the waste receptacle.

The information includes categorization notifications. The categorization notifications indicate whether waste placed in the waste receptacle is properly placed wholly or partially in another receptacle, or compostable.

The device may be configured to transmit to a remote server the measurement data from the at least one sensor, and/or a result from the processor analyzing the measurement data.

The at least one sensor may be configured to continuously capture the measurement data and may be a weight sensor, a computer vision imaging sensor, a visual sensor, an ultrasonic sensor, and/or a chemical sensor.

The at least one sensor may be the computer vision imaging sensor, and the computing vision imaging sensor may include a processor running an artificial intelligence trained on further measurement data obtained from at least one further sensor associated with at least one further waste receptacle.

An exemplary system is provided that includes a receiving module configured to receive data from a location. The data obtained from a sensor measuring a first amount of a first type of waste. The exemplary system may also include a processor configured to receive the data from the receiving module and process the data, and a sending module configured to send notifications to a user device. The notifications may include information relating to the first amount. The user device may be configured to display the notifications to a user.

The processor may be further configured to classify the waste based on a statistical analysis models. The data may be measurements of the waste, and the measurements may be a weight, a volume, and/or a composition. The processor may determine amounts of different types of waste generated.

The processor may be further configured to update a machine learning model for identifying the different types of waste generated based on the measurements.

The receiving module is configured to receive second data from a second location. The second data may be obtained from a second sensor measuring a second amount of the first type of waste. The processor may be configured to receive the second data from the receiving module and process the second data and compare the first data and the second data.

The sending module may be configured to send second notifications to a second user device. The second notifications may include further information relating to the second amount. The second user device may be configured to display the second notifications to a second user. The notification may further include an award, an indication of community support, a first comparison of the first amount and a community waste metric, and/or a second comparison of a daily average of the location and a community daily average.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
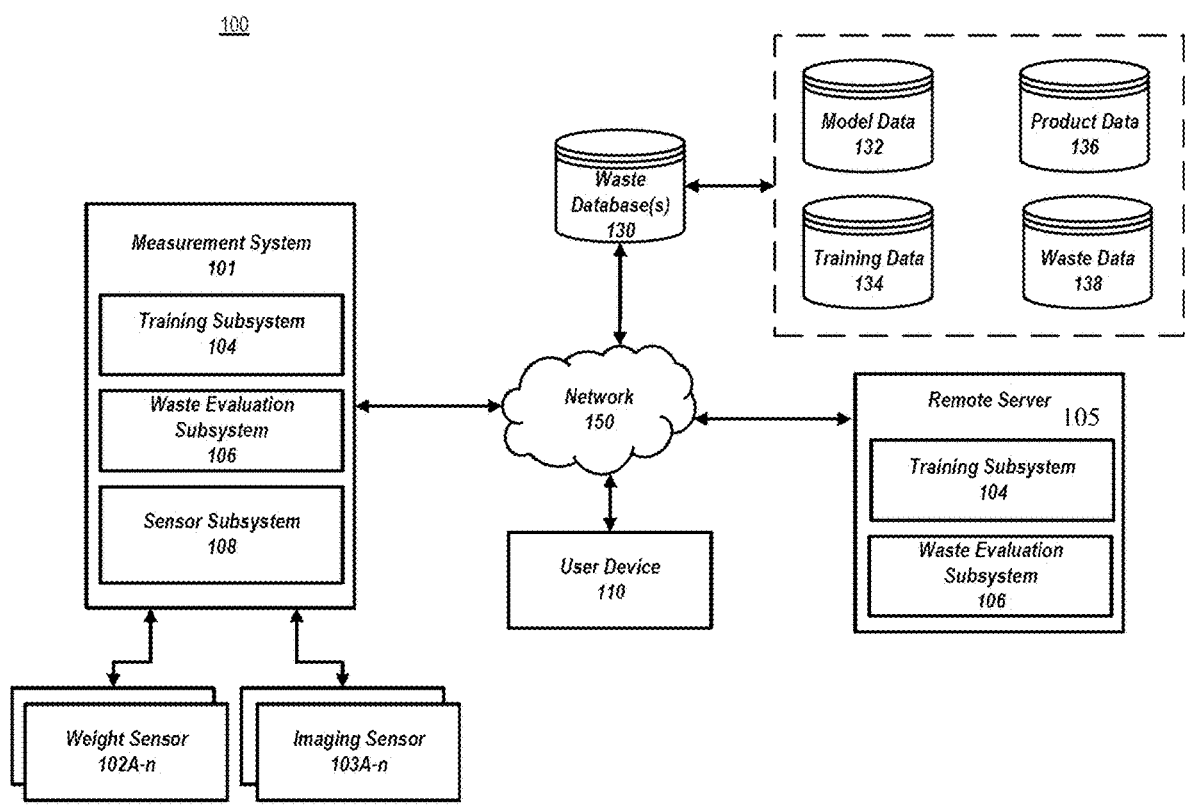
FIG. 1 is an example computing environment for implementing a waste tracking system at the user or household level, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of waste measurement at the individual or household level. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Users wishing to reduce waste are confronted by a lack of individual and household specific metrics that inform users about the waste they generate. While waste services may broadly track the amount of waste they process, those metrics are too far removed from the individual users of the service to inform a user about the waste they generate as the individual or household level. A domestic waste tracking system is needed help users become smarter about the waste they produce and help them reduce what they throw away, such as by identifying recyclable or compostable waste.

Example embodiments of a household waste tracking system may continuously capture signal data from one or more sensors, process the measurements, and store results of the processing to a memory. The one or more sensors may include one or more weight sensors, computer vision imaging sensors, visual sensor, ultrasonic sensor, chemical sensor, or other sensors for determining properties about waste generated by a household. One or more sensors may be associated with a waste receptacle to capture signal data, like measurement data including one or more measurements, images, or the like, indicative of the waste added to the receptacle. The sensors may transmit captured signal data for processing, which in some examples may be processed by a local device. For example, the local device may determine properties of waste added to a receptacle based on the measurement data obtained from the one or more sensors associated with the waste receptacle. In some examples, the local device may transmit information about the data obtained from the sensors or results determined based on processing the data obtained from the sensors to a remote server. Some embodiments may determine a household profile, such as based on properties of waste added over time to one or more receptacle tracked by the local device, to estimate the daily average to then provide feedback to the user about target settings. The local device may communicate with the remote server to update artificial intelligence and machine learning models by which captured sensor data may be processed. In some examples, the models may process other data, such as to determine target based goals, determine notifications, and determine other feedback or recommendations based at least in part on captured signal data and the household profile. The local device or remote server may use data processing and statistical analysis models to classify waste, such as by properties determined from measurements like weight, volume, etc., by type/composition to determine amounts of different types of waste generated. In some examples, the remote server may store and update user profiles and determine notifications or other feedback to inform a user or household about the waste generated. In some examples, the notifications may inform a user temporally proximate to the addition of waste placed in a receptacle as to whether the waste added to the receptacle should be placed (wholly or partially) in another receptacle (e.g., for receiving a specific type/composition of waste) to improve mis-categorization of waste destined for bulk waste processing (e.g., recycling), or to indicate to a user that certain the waste is compostable.

FIG. 1 is an example computing environment 100 for implementing a waste tracking system at the user or household level, in accordance with some embodiments. The computing environment 100 may include one or more measurements systems 101, user devices 110, servers 105, and databases 130. User device as used throughout this application, refers to an add-on device for attaching or coupling in some manner to a bin, an integrated bin utilizing the present technology, and/or an application running on a mobile device coupled to a one or both of the previously described devices. While only one remote server system 105, and database, e.g., waste database 130, are shown, the server system 105 or database may include multiple compute or storage servers or be implemented by a distributed system including multiple compute or storage nodes, and functionality or data stored may be distributed across multiple ones of nodes or servers. Each of the measurement system 101, server system 105, database 130, and user devices 110 (or other components described herein) may communicate with one another (which is not to suggest that a component need to communicate with every other component) via a network 150, such as the internet, which may include public or private local area networks. Each of these computing devices may have the features of the computing system described below, including a processor and memory. In some embodiments, the functionality described herein may be implemented with program code or other instructions stored on a tangible, non-transitory, machine-readable medium, such that when that program code is executed by one or more processors, the described functionality is effectuated.

Embodiments of the measurement system 101 may include a training subsystem 104, an evaluation subsystem 106, and a sensor subsystem 108 by which functionality of the measurement system 101 may be implemented. Functionality of these components or otherwise ascribed to the measurement system 101 may be divided in different ways, in some cases among different computing devices. For example, one or more of these components may be hosted on a remote server 105 supporting measurement system 101 functionality, or a server system implemented with a plurality of servers that each, or collectively, execute processes upon data or portions of data like that described herein. In some examples, the database 130 may be implemented within the context of the environment to track household waste at the bin level, such as by one or more servers or storage servers by which functionalities of components of a remote server 105 are implemented, or separately, such as within a cloud storage system, which the measurement system 101 or remote server 105 may communicate with to store data and obtain stored data.

The measurement system 101, in some embodiments, may include a training subsystem to train a model (e.g., during a startup training phase) which may be run to respond to novel inputs during runtime, and may periodically or continuously retrain the model. In some embodiments, the training subsystem 104 may report data to a remote server 105 and the measurement system 101 may receive a model or updated model to execute during runtime. Training processes may be run on the measurement system or a server system that is remote from the measurement system, for instance in a data center.

The measurement system 101 may include a waste evaluation subsystem 106 to determine measurements and properties of waste added to a waste receptacle based on signals received from sensors associated with the waste receptacle and, in some cases, other data. For example, the evaluation subsystem may determine a change in weight in a waste receptacle to determine a weight of waste added to a waste receptacle at a particular time, e.g., like an instance of waste being added to the waste receptacle, or over a duration of time. In another example, the evaluation subsystem may determine a change in volume consumed by waste in the receptacle at a particular time, e.g., like an instance of waste being added to the waste receptacle, or over a duration of time. In another example, the evaluation subsystem may determine a change in odor or presence of an odor producing chemical of waste in the receptacle, e.g., like an instance of waste having an odor being added to the waste receptacle, or over a duration of time. In another example, the evaluation subsystem may determine other changes or characteristics of waste add to, or within a waste receptacle. For example, an ultrasonic sensor may determine information about waste in one or more layers of waste within a waste receptacle. In another example, a lidar or other computer vision imaging sensor 103, like a camera, may determine a change in shape of a layer of waste (e.g., exposed top layer) within a waste receptacle.

The waste evaluation subsystem 106 may determine properties of waste added to a waste receptacle based on one or more of the above measurements. In some example embodiments, the waste evaluation subsystem 106 may executed one or more trained models to determine a classification of waste added to a receptacle. For example, the model may classify, based on the measurements, properties of waste added to a waste receptacle. Example properties may include, but are not limited to, a type or composition of waste added to a receptacle, a volume, etc., and weight of the type of waste. In some examples, a household may include a plurality of different receptacles which may generally receive waste of a particular type or composition. In some cases, different models may be associated with different bins, at least by expected types of waste. In employments where a variety of different sensor types are employed, the models may be trained based on sensor outputs specific to their respective bins, such as to account for differences in receptacle size, sensor environment (e.g., lighting, position, composition of bin, etc.), among other factors. In some examples, a remote server may include a waste evaluation subsystem 106 to determine information like that described above and may return a result to the measurement system 101 or the user device 110.

The waste evaluation subsystem 106 may track waste by classification, e.g., plastics-recyclable, plastics-non-recyclable, glass, cardboard, paper, bio/food waste, among other classifications, and aggregate properties for respective waste types. Thus, for example, the evaluation subsystem 106 may output metrics indicative of waste generated, such as per-bin, and across a collection of bins for which waste is tracked in a household, and the amounts of different types (e.g., classifications) of waste generated. The above and other information may be stored within waste data 138. The data, in some examples, may be used to augment training data 134 to iteratively train models to update model 132 for classifying waste.

In some examples, the waste evaluation subsystem 106 may receive external data about products consumed within a household, such as products ordered, or based on shopping lists, or other data sources. Product data 136 may include information about the different types of products, such as amount or estimated amount of packaging waste, and in some cases may include identifiers associated with similar products or suppliers with reduced packaging. The evaluation subsystem 106, in some examples, may infer an amount of waste associated with a given product (e.g., packaging) based on date of receipt/pickup (e.g., groceries) or products at the household.

The measurement system 101 may include a sensor subsystem 108 by which signal data is received or captured from one or more sensors. The sensor subsystem may request data from some sensors (e.g., poll some sensors) and obtain (e.g., receive) requests to receive transmit data (e.g., pushed) from some sensors. In some examples, the sensor subsystem may poll one or more sensors in response to receiving an indication from another sensor. For example, in response to detecting a change in weight, the sensor subsystem may poll an imaging sensor 103 to capture imaging data, or in response to detecting a change in imaging data, the subsystem may poll a weight sensor 102. In another example, another sensor may detect a change in a status of a receptacle (e.g., opened) and the sensor subsystem may poll or stream data from the weight and imaging sensor (or other types of sensors described herein), such as until a change in status (e.g., closed) of the receptacle is detected. In some examples, the sensor subsystem 108 may poll another sensor (e.g., chemical) or other type of sensor in response to the cycling between states.

As noted above, the measurement system 101 may, in some examples, offload processing of certain data or operations to a remote server. Thus, for example, a remote server 105 may perform some or all of the operations associated with the training or waste evaluation subsystem. In either case, the measurement system or remote server may transmit information determined about waste generated by a user or a household of the user to a user device, like a user computing device of the user (or a plurality of user devices associated with a household). In some examples, the user device 110 may execute an application, like a native application, that may request and receive data via an API of the measurement system 101 or the remote server 105. For example, the native application may receive and display metrics corresponding to different waste receptacles over time, current status of a receptacle (e.g., based on current sensor output), comparison of metrics associated with the user to other households (e.g., like other similar households based on a profile of the user's household—like a composition of the household—and members thereof that spend their day at home or out of the home for work/school, etc.). In some cases, alternative products may be recommended based on inference of waste generated from packing, or amount of a product to order based on waste generated (e.g., small serving vs large serving) or indication that bulk or other packaging with reduced waste is available for a particular product.

A training subsystem 104 may train one or more models, which may include a neural network, deep learning model, or other machine learning model described herein. Examples of such models may include one or more waste classification models or one or more encoder models. The different models may be trained in different ways (separately or concurrently through end-to-end training), and some models may receive inputs based on the outputs of other models. Training of a model may comprise end-to-end training, or training of different stages (e.g., like sub-models) of a model (e.g., like a pipeline). Some examples may combine these approaches, such as by training a model and then including that model within a model or as a stage of a pipeline trained end-to-end. The training may be performed using data obtained by the measurement system 101, waste databases 130, or user devices 110 (e.g., like confirmation or indication of a classification and properties of waste), such as via one or more sensors 109, 102A-n, 103A-n or over the network 150. The training subsystem 104 may store, access, or update one or more models in various states of training from within the database 130 or a local memory. For example, the training subsystem 104 may access a previously trained machine learning model (or a model undergoing training) and update the model based on newly received (or classified data) and store an updated version of the model locally or within the database 130. The training subsystem 104 may access a trained model to process data which in turn may be used to train another model. Thus, the training subsystem 104 may store or access data within the database 130, such as data of one or more models 132 and training data 134, and the training subsystem 104 may process such data to train models by which feedback data 136 may be processed to generate classifications about waste (e.g., waste data). Product data 136 may be used to further augment training data 134 for one or more models.

Some embodiments of the training subsystem 104 may train an encoder model (e.g., a neural network, which in some examples may be an attentive neural network, like a deep learning neural network or recurrent neural network, including or integrating an attention model) to reduce high-dimensional data, like a vector having 10,000, 100,000 or 1,000,000 or more dimensions, into a latent space embedding vector having significantly fewer dimensions, like 500 or fewer dimensions. Thus, for example, the dimensionality of sensor data obtained from computer vision imaging sensors, like lidar or imaging cameras, or data from ultrasonic or other sensors, may be reduced from high dimensionality data to low dimensionality data (e.g., having orders of magnitude less dimensions). Some embodiments may determine pairwise distances in the embedding space between respective pairs of the vectors. Distances may be calculated with a variety of distance metrics including Minkowski distance, Euclidean distance, cosine distance, Manhattan distance, and the like. Changes between successive measurements may be determined based on such distances, such as to determine changes in depth, profile, or the like of waste added to a waste receptacle. A training subsystem 104 may store one or more resulting trained models in memory to be applied to runtime problems, for instance, classification of waste added to a waste receptacle. In some cases, a training subsystem 104 may obtain feedback (e.g., responses) on classifications, such as from a user device 110 which may be prompted to confirm a classification determined by a waste evaluation subsystem when waste is added to a waste receptacle.

Figure 2A:
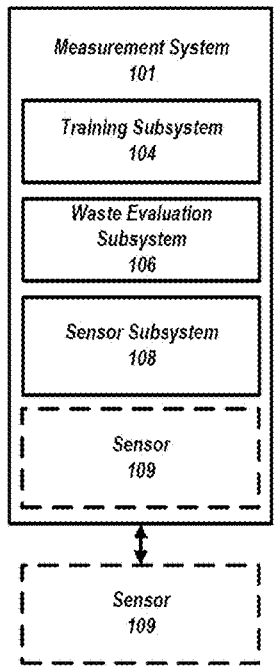
FIGS. 2A and 2B are example configurations for implementing a waste tracking system at the user or household level, in accordance with some embodiments.
Figure 2B:
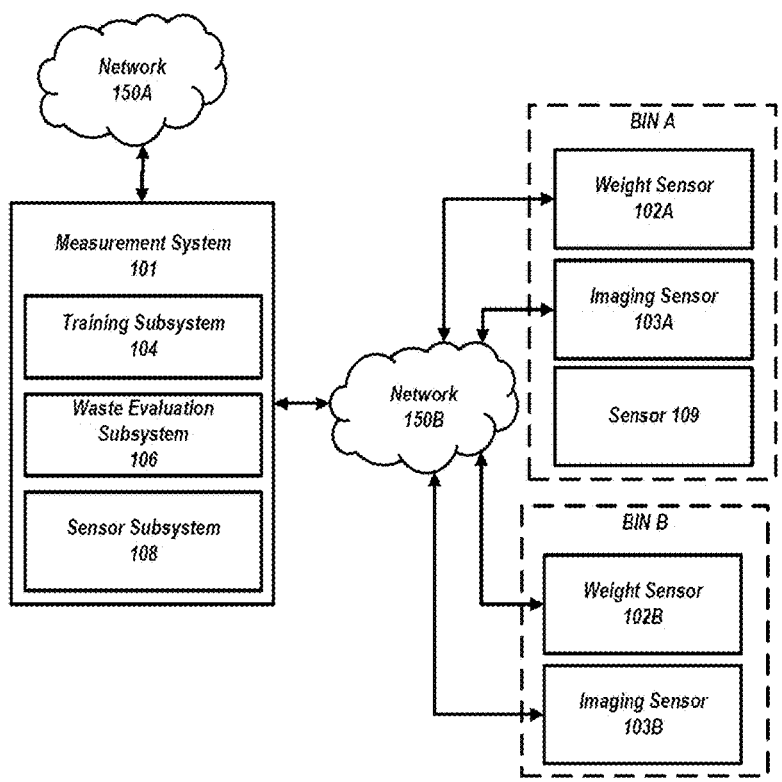

FIGS. 2A and 2B are example configurations for implementing a waste tracking system at the user or household level, in accordance with some embodiments. For example, as shown in FIG. 2A, a measurement system 101 may incorporate a sensor 109 or communicate with one or more sensors 109, or both incorporate a sensor 109 and communicate with one or more sensors. In many expected deployments, one embedded device, like a measurement system, may incorporate the measurement system logic and other sensor devices with reduced logic may communicate with the measurement system, e.g., like a hub. Thus, for example, one measurement system in a home may support a suite of sensors. FIG. 2B shows an additional example in which a first sensor set, for example comprising a weight sensor 102A, an imaging sensor 103A and/or a sensor 109, is associated with a first waste receptacle (e.g., BIN A), and another set, for example comprising a weight sensor 102B, an imaging sensor 103B, is associated with a second waste receptacle (e.g., BIN B). The sensors may wirelessly transmit sensor data signals to the measurement system (e.g., over a local network 150B, like local WiFi, Bluetooth, or other local network), which may communicate with a remote server over another network (e.g., over a network 150A, like the internet). In some cases, the measurement system 101 may be wholly hosted within the cloud (e.g., as one or more remote servers) and an intermediate hub (not shown—like an in-home assistant or smart device) may relay sensor data.

Figure 3:
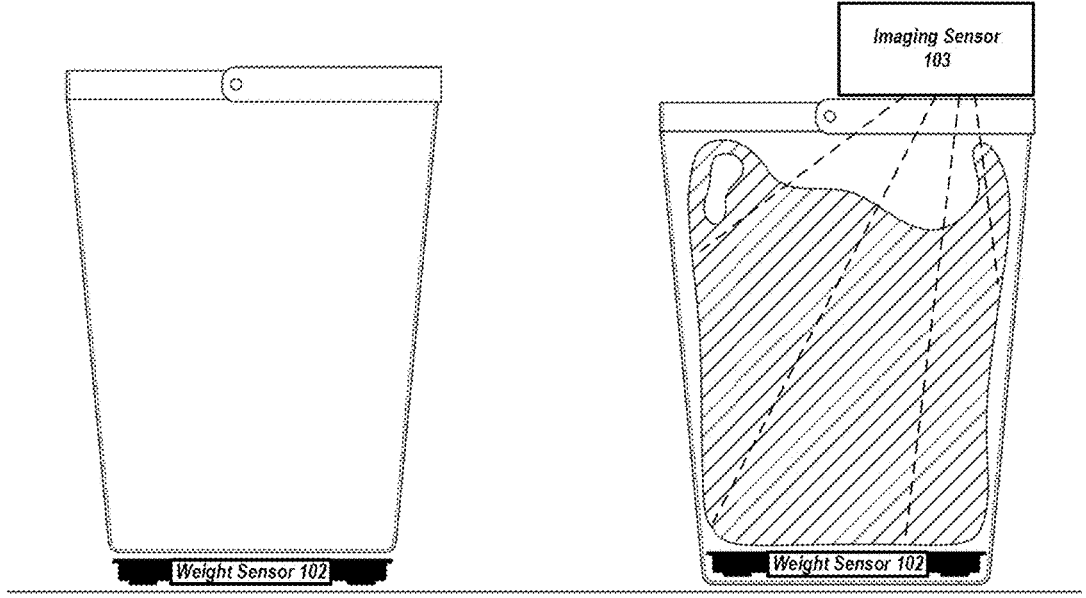
FIG. 3 illustrates example sensor configurations for tracking waste added to a waste receptacle at the user or household level, in accordance with some embodiments.

FIG. 3 illustrates example sensor configurations for tracking waste added to a waste receptacle at the user or household level, in accordance with some embodiments. FIG. 3 illustrates example positioning of an example weight sensor 102, like a scale, to support exiting receptacles of varying shapes and sizes. Different sized weight sensors 102, like approximately 6"-36" width/length square or diameter circle or rectangular having differing length and width within the example range may support a variety of different sized bins commonly used by households. The figure further shows an example imaging sensor 103, like a camera or lidar, that may be positioned to capture information about waste placed within a bin. As noted, other sensor types may also be used. In some examples, weight sensors 102 and other sensors may be incorporated within a receptacle. For example, an outer shell may include weight sensors 102, such as at a bottom or around its edge, upon which an inner bin rests and waste is added to the inner bin. Similarly, an imaging sensor 103 or other sensors (or multiples thereof) may be incorporated within a lid of such a receptacle. A camera may be positioned to capture images when the lid is opened, and a lidar (e.g., emitter and sensor) device may determine information about the contents of the bin when the lid is closed. In some examples, a sensor may report open/closed state of the bin to wake sensors from a low power state to ready themselves to capture data about waste added (or removed in some cases) from the bin.

Figure 4:
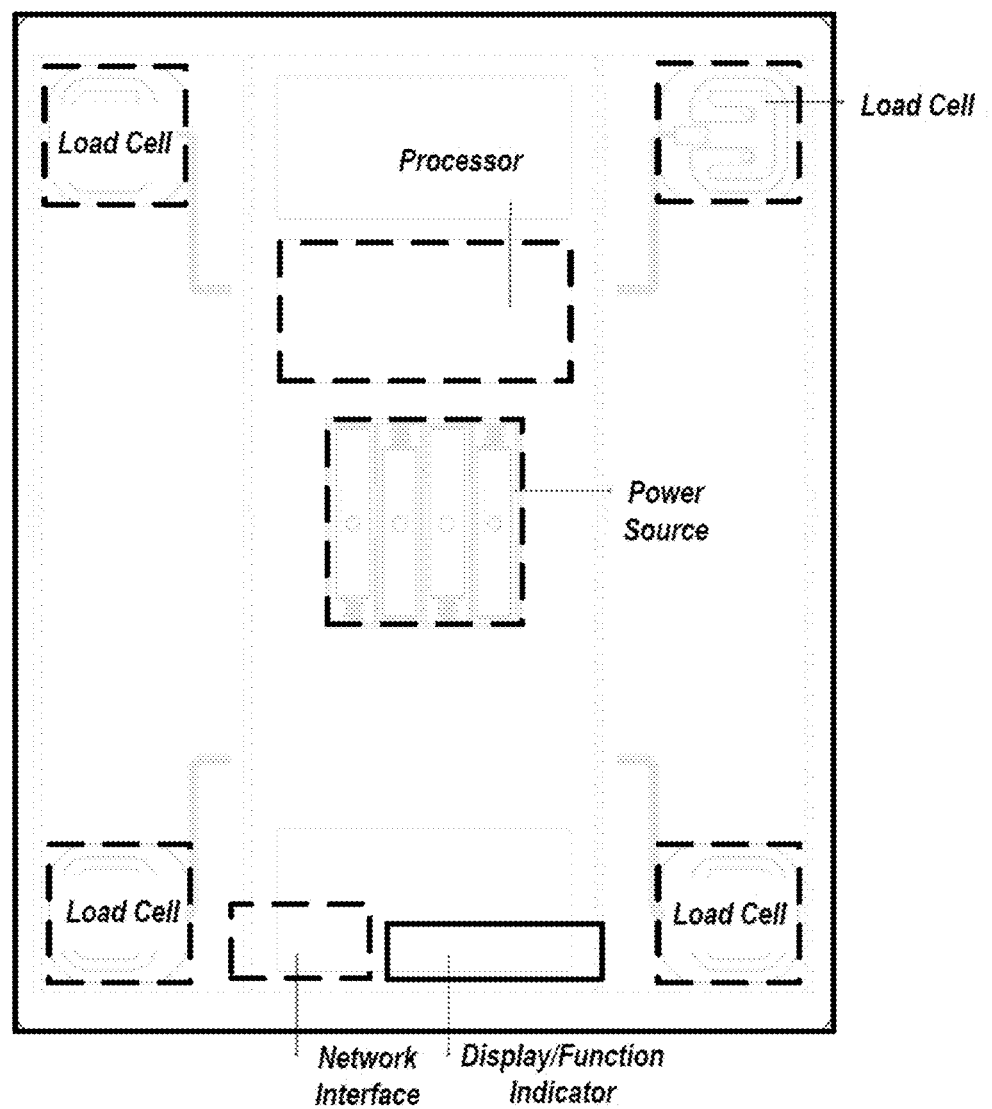
FIG. 4 illustrates an example weight sensor device for capturing a measurement of waste added to a waste receptacle at the user or household level, in accordance with some embodiments.

FIG. 4 illustrates an example weight sensor device for capturing a measurement of waste added to a waste receptacle at the user or household level, in accordance with some embodiments. In some cases, such a weight sensor device may include the measurement system 101 logic and interface with one or more other sensors that may omit the full suite of such logic, e.g., with one weight sensor device associated with a first bin acting as a hub for other sensors associated with other bins. As shown, an example weight sensor 102 may include components such as—Computer processor-Microcontroller-analog to digital signal converter-load cell-weight bearing surface plate/mesh designed for easy integration-Uninterrupted power supply-Cable harness. Other sensor types may include cameras or lidar for computer vision, chemical sensors, ultrasonic sensor. In some cases, a hub measurement system, even when including a given type of system, may include logic to process data received from other sensor types, such as volumetric estimation algorithms and the like.

In some examples, the system is custom designed to fit seamlessly into the customer's household. Example systems may include modular designs to fit various household configurations. Example systems may support 0 up to 1000 pound bins. Example systems in the may be powered independently by a dedicated rechargeable battery source. Example system may include a portable sensor (or sensors) to collect data outside the home (e.g., office, travel) and may report that data e.g., periodically, to a remote server in association with the user or a user device of the user.

Example systems may support household composting and recycling of waste. Example systems may be integrated into interiors supplied and fitted by third parties. Example systems may estimate waste reduction to CO2 emission savings based on determined classifications and amounts of waste relative to past periods or based on selections of alternative produce or packaged goods. Example systems may determine a scoring matrix, and include a parameter for calculating total impact on global waste reduction.

Figure 5:
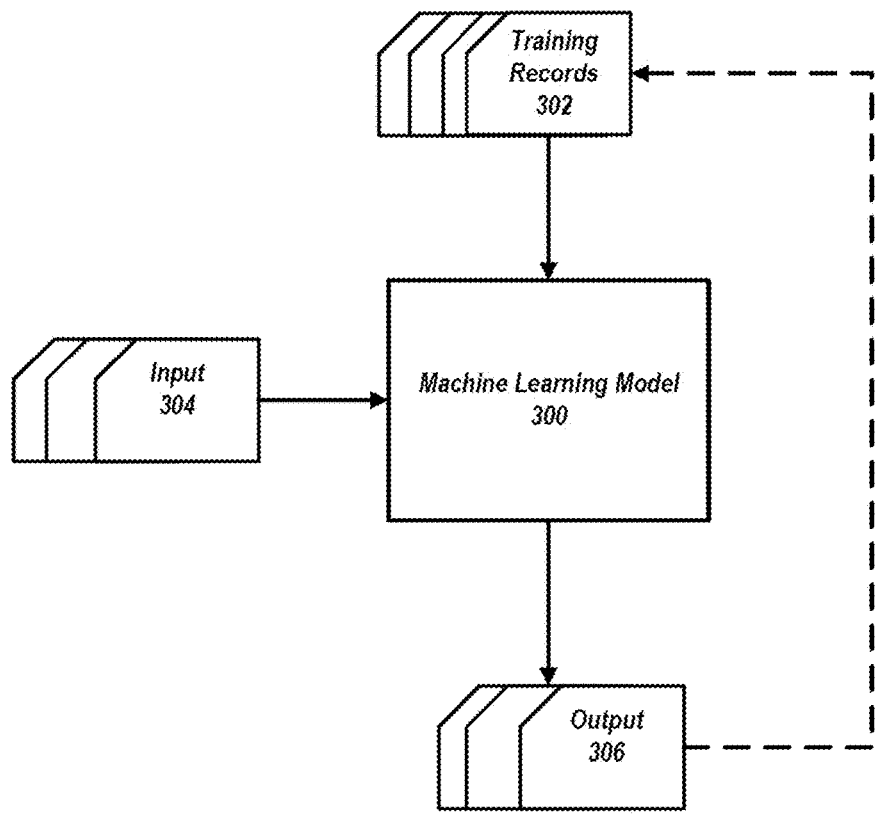
FIG. 5 is an example machine learning model in accordance with some embodiments.

FIG. 5 is an example machine learning model in accordance with some embodiments. As an example, described with respect to FIG. 5, a machine learning model 300 may take one or more inputs and generate one or more outputs. Training records 302 may be used in training the machine learning model 300. Examples of a machine learning model 300 may include a neural network or other machine learning model described herein, may take inputs 304 (e.g., input data that described above) and provide outputs 306 (e.g., output data like that described above) based on the inputs and parameter values of the model. For example, the model 300 may be fed an input or set of inputs 304 for processing based on sensor outputs and other data or outputs determined by other models and provide an output or set of outputs 306. In some cases, outputs 306 may be fed back to machine learning model 300 as input to train machine learning model 300 (e.g., alone or in conjunction with indications of the performance of outputs 306, thresholds associated with the inputs, or with other feedback information). In another use case, machine learning model 300 may update its configurations (e.g., weights, biases, or other parameters) based on its assessment of a prediction or instructions (e.g., outputs 306) against feedback information (e.g., received classification confirmations or inferred classification confirmations) or outputs of other models (e.g., classification scores). In another use case, such as where machine learning model 300 is a neural network, connection weights may be adjusted to reconcile differences between the neural network's prediction or instructions and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 300 may be trained to generate better predictions or instructions.

In some embodiments, the machine learning model 300 may include an artificial neural network. In such embodiments, machine learning model 300 may include an input layer and one or more hidden layers. Each neural unit of the machine learning model may be connected with one or more other neural units of the machine learning model 300. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 300 may be self-learning or trained, rather than explicitly programmed, and may perform significantly better in certain areas of problem solving, as compared to computer programs that do not use machine learning. During training, an output layer of the machine learning model 300 may correspond to a classification, and an input known to correspond to that classification may be input into an input layer of machine learning model during training. During testing, an input without a known classification may be input into the input layer, and a determined classification may be output. In some examples, a classification may be an indication of whether a selection of samples is predicted to optimize an objective function that balances between exploration of a semantic spaces and optimization of convergence in explored areas. In some examples, a classification may be an indication of a type and amount of waste added to a receptacle, such as based on a vector indicative of one or more sensor outputs obtained in association with the addition of the waste to the receptacle.

In some embodiments, a machine learning model 300 may be structured as a factorization machine model. A machine learning model 300 may be a non-linear model or supervised learning model that can perform classification or regression. For example, the machine learning model 300 may be a general-purpose supervised learning algorithm that a system uses for both classification and regression tasks. Alternatively, the machine learning model 300 may include a Bayesian model configured to perform variational inference (e.g., deviation or convergence) of an input from previously processed data (or other inputs in a set of inputs). A machine learning model 300 may be implemented as a decision tree or as an ensemble model (e.g., using random forest, bagging, adaptive booster, gradient boost, XGBoost, etc.). In some embodiments, a machine learning model 300 may incorporate one or more linear models by which one or more features are pre-processed or outputs are post-processed, and training of the model may comprise training with or without pre or post-processing by such models.

In some embodiments, a machine learning model 300 implements deep learning via one or more neural networks, one or more of which may be a recurrent neural network. Some embodiments may reduce dimensionality of high-dimensional data (e.g., with one million or more dimensions) before it is provided to a model, such as by forming latent space embedding vectors (e.g., with 500 or fewer dimensions) based on high dimension data. In some embodiments, the high-dimensional data may be reduced by an encoder model (which may implement a neural network) that processes vectors or other data output by one or more sensors. For example, training of a machine learning model 300 may include the generation of a plurality of latent space embeddings as, or in connection with, outputs 306 of the model which may be classified (e.g., for additions of waste to a waste receptacle).

Examples of machine learning model may include multiple models. For example, a clustering model may cluster latent space embeddings represented in training (or output) data. In some cases, classification of a (or a plurality of) latent space embedding within a cluster may indicate information about other latent space embeddings within, or which are assigned to the cluster. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained. In some examples, a representative embedding for a cluster of embeddings may be determined, such as via one or more samplings of the cluster to obtain rankings by which the representative embedding may be selected, and that representative embedding may be sampled (e.g., more often) for ranking against other embeddings not in the cluster or representative embeddings of other clusters.

Figure 6A:
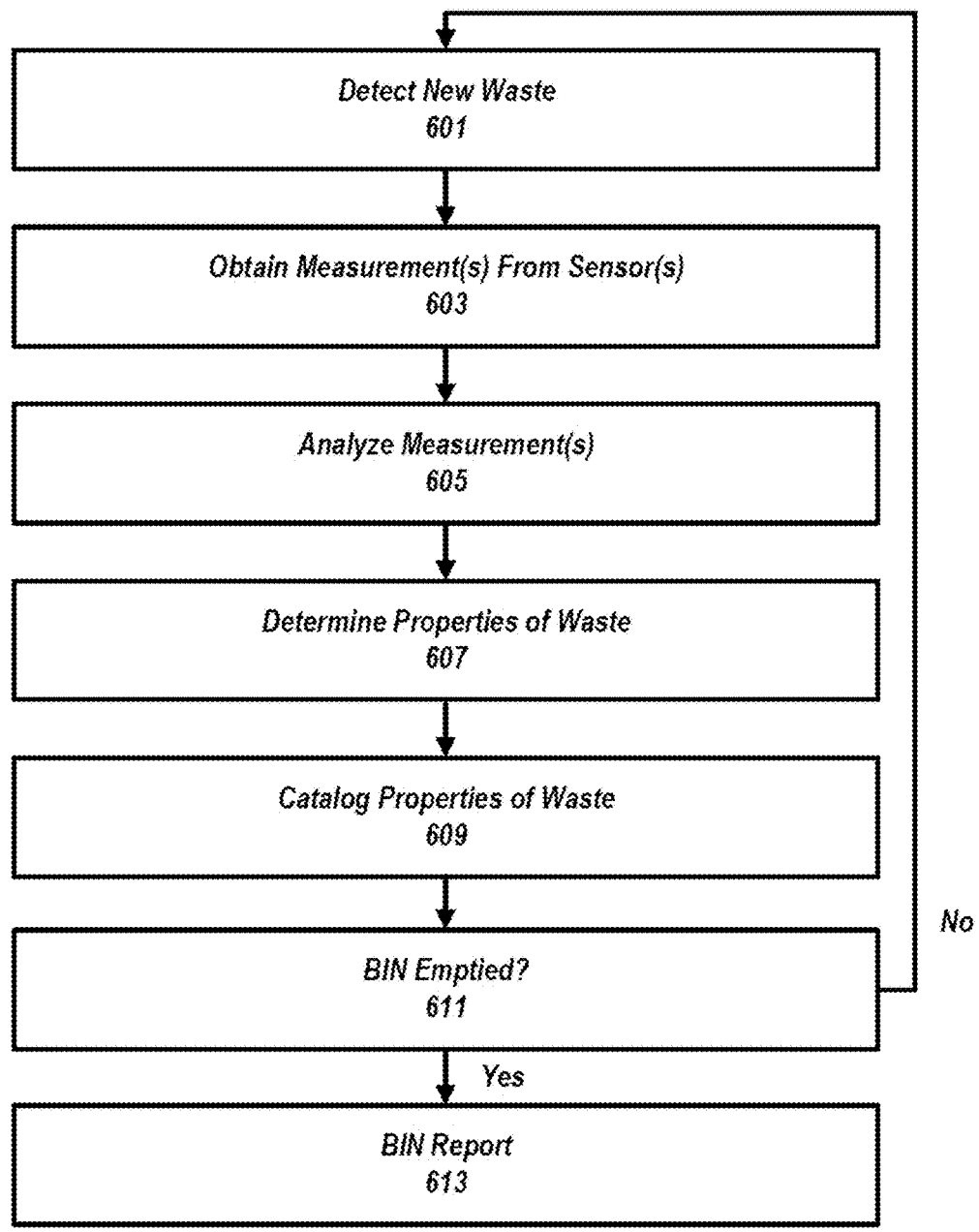
FIG. 6A is a flowchart of an example process for determining properties about waste added to a waste receptacle to track waste generation, in accordance with some example embodiments.

FIG. 6A is a flowchart of an example process for determining properties about waste added to a waste receptacle to track waste generation, in accordance with some example embodiments, which may be executed with devices like those described in the context of FIGS. 1-4. The process may comprise the steps:

Detect New Waste 601;
Obtain Measurement(s) from Sensor(s) 603;
Analyze Measurement(s) 605;
Determine Properties of Waste 607;
Catalog Properties of Waste 609;
BIN Emptied? 611; (If No return to step 601, if yes proceed to step 613)
BIN Report 613.

Figure 6B:
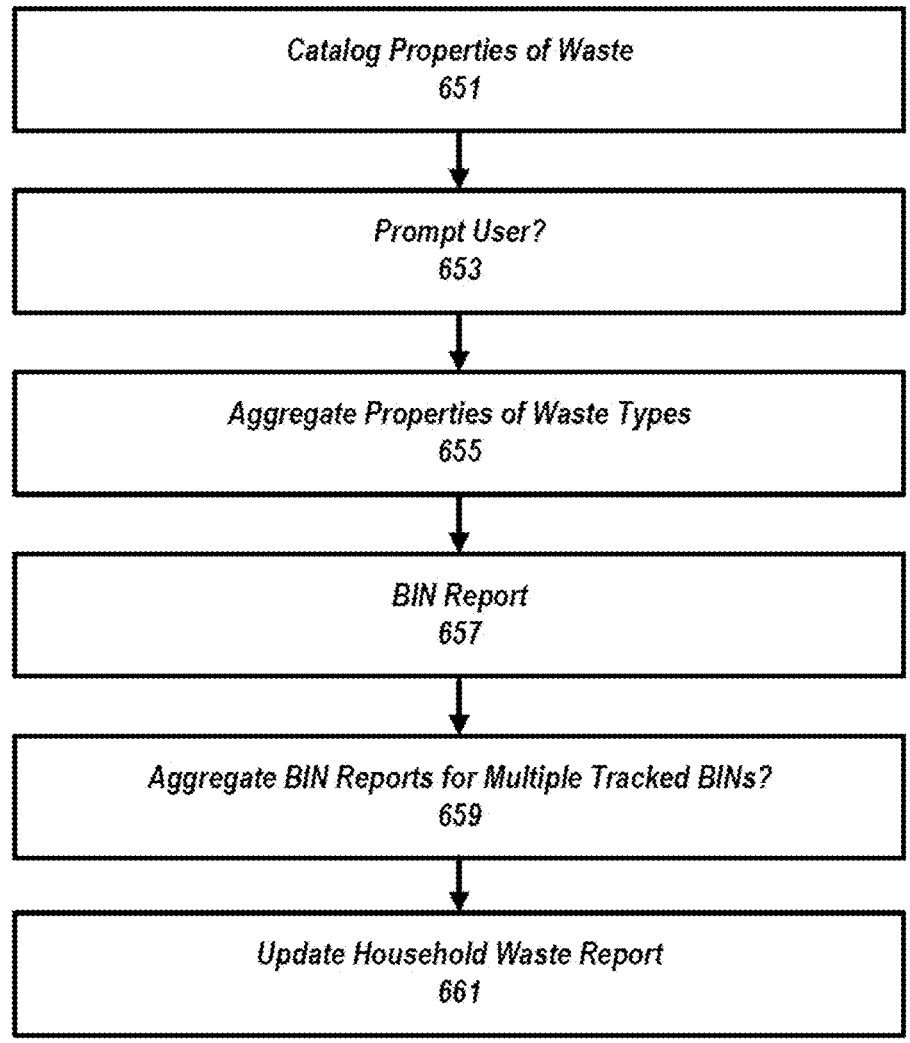
FIG. 6B is a flowchart of an example process for reporting on tracked waste generation across one or more waste receptacles, in accordance with some example embodiments.

FIG. 6B is a flowchart of an example process for reporting on tracked waste generation across one or more waste receptacles, in accordance with some example embodiments, which may be executed with devices like those described in the context of FIGS. 1-4. The process may comprise the steps:

Catalog Properties of Waste 651;
Prompt User? 653;
Aggregate Properties of Waste Types 655;
BIN Report 657;
Aggregate BIN Reports for Multiple Tracked BINs? 659;
Update Household Waste Report 661.

Figure 7A:
FIGS. 7A and 7B illustrate an example user interface for registering sensors in association with a receptacle for tracking waste generated, in accordance with some embodiments.
Figure 7A:
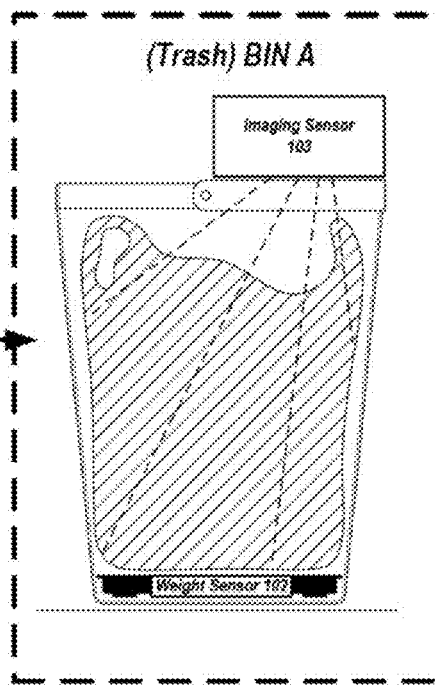
Figure 7B:
Figure 7B:
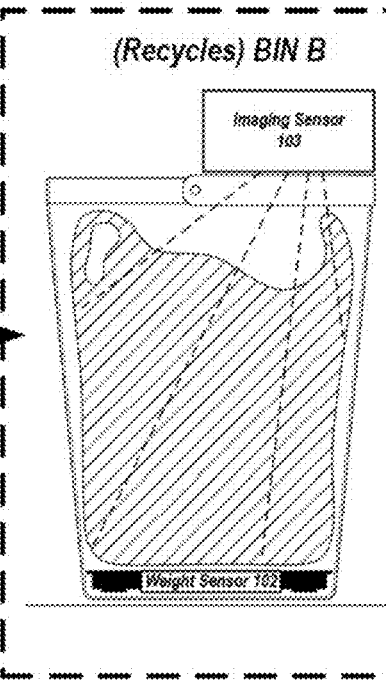

FIGS. 7A and 7B illustrate an example user interface for registering sensors in association with a receptacle for tracking waste generated, in accordance with some embodiments, which may be generated to associate one or more sensors like those described in the context of FIGS. 1-4 with a waste receptacle.

Figure 7C:
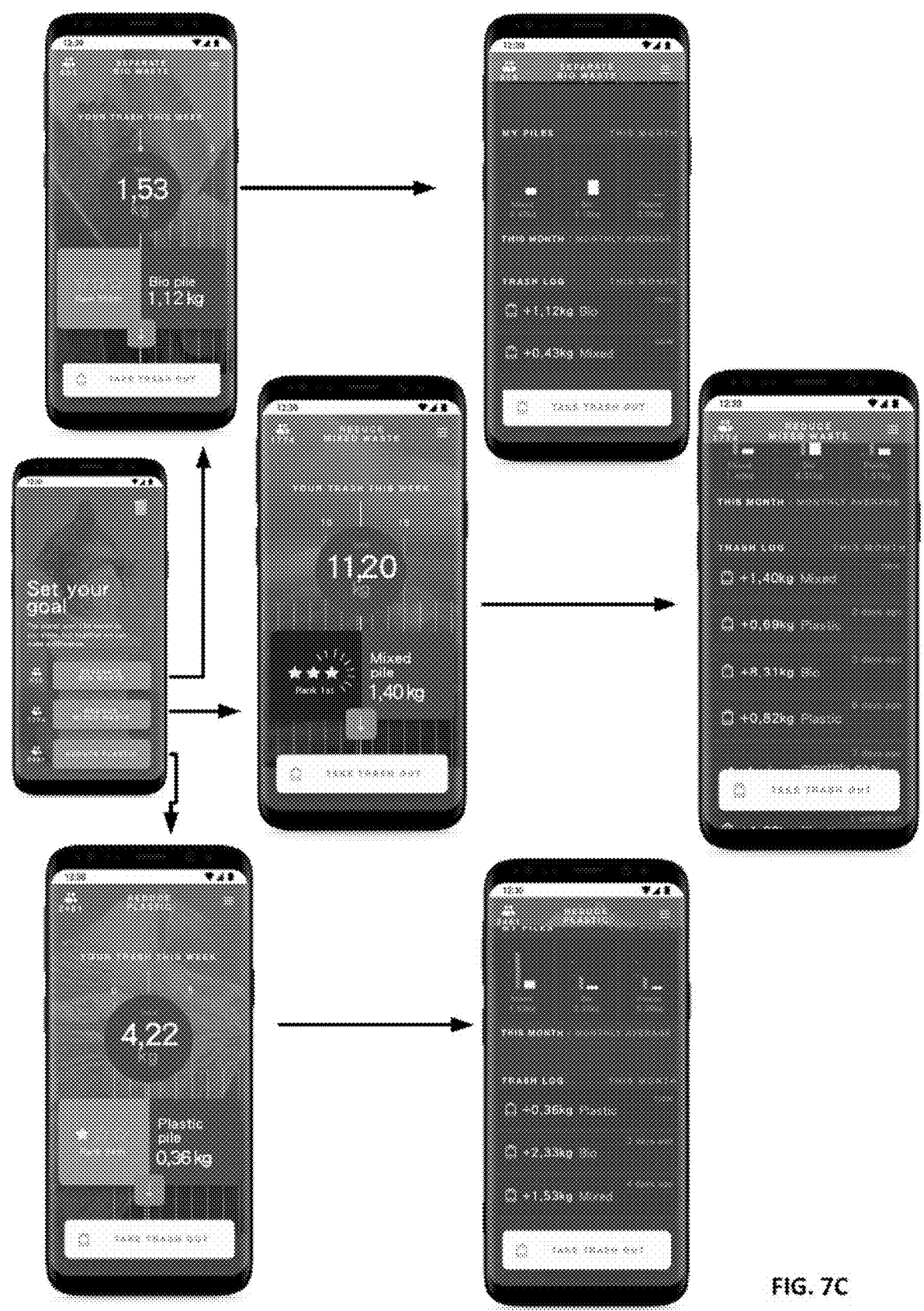
FIG. 7C illustrates example user interfaces for reporting properties determined about generated waste added to waste receptacles, in accordance with some embodiments.

FIG. 7C illustrates example user interfaces for reporting properties determined about generated waste added to waste receptacles, in accordance with some embodiments, which may be generated to display metrics indicative of types of waste generated by a household based on classifications and properties of waste determined by configurations like those described in the context of FIGS. 1-4 with a waste receptacle.

Figure 8:
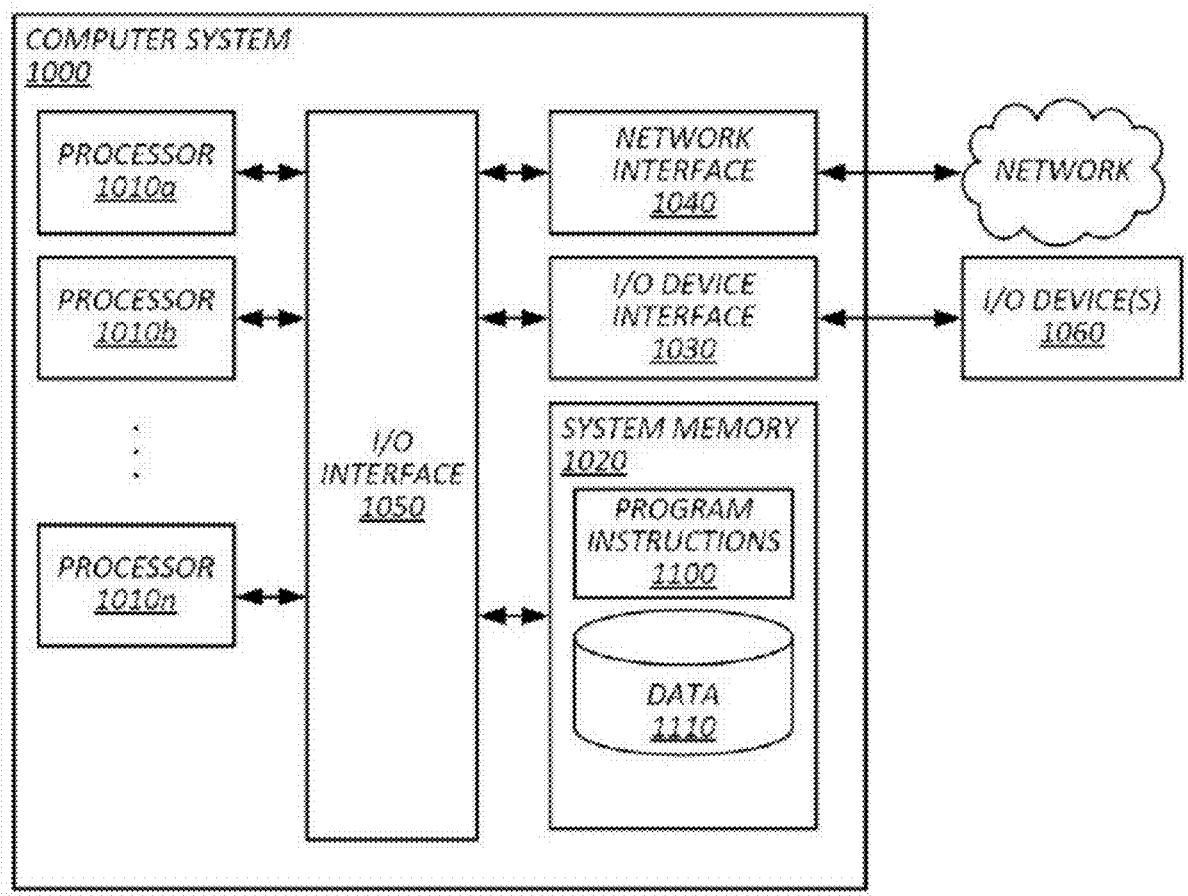
FIG. 8 is a physical architecture block diagram that shows an example of a computing device (or data processing system) by which some aspects of the above techniques may be implemented.

FIG. 8 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules or subsystems described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

Figure 9:
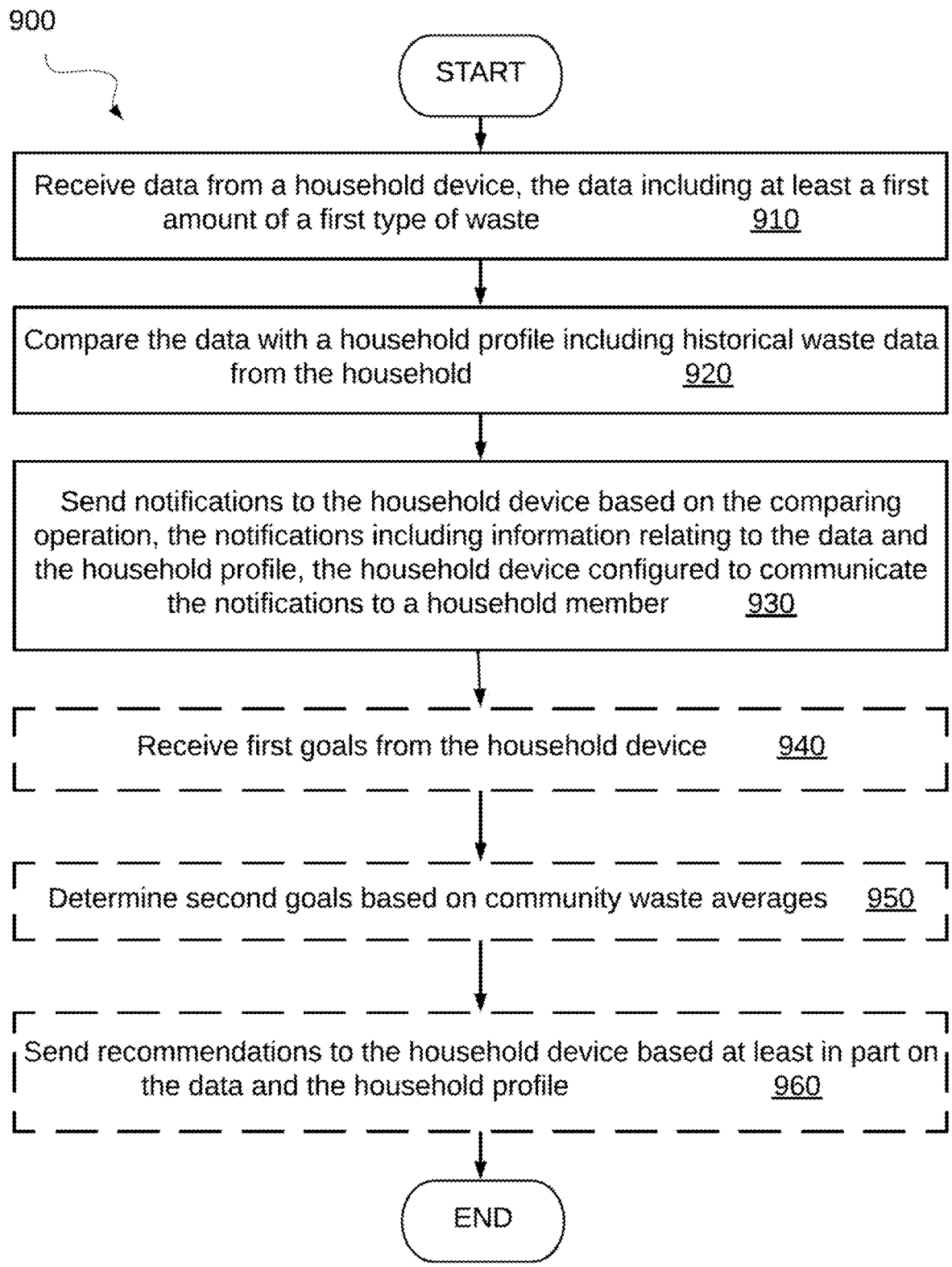
FIG. 9 is a flowchart illustrating a method according to an exemplary embodiment of the present invention.

FIG. 9 is a flow chart illustrating method 900 according to the present invention. In FIG. 9, optional steps in method 900 are shown in dotted boxes. The flow in method 900 flows from the start oval to operation 910, which indicates to receive data from a household device. The data includes at least a first amount of a first type of waste. From operation 910, the flow in method 900 proceeds to operation 920, which indicates to compare the data with a household profile including historical waste data from the household. From operation 920, the flow in method 900 proceeds to operation 930, which indicates to send notifications to the household device based on the comparing operation. The notifications include information relating to the data and the household profile, and the household device is configured to communicate the notifications to a household member. From operation 930, the flow in method 900 proceeds to optional operation 940, which indicates to receive first goals from the household device. From optional operation 940, the flow in method 900 proceeds to optional operation 950, which indicates to determine second goals based on community waste averages. From optional operation 950, the flow in method 900 proceeds to optional operation 960, which indicates to send recommendations to the household device based at least in part on the data and the household profile. From optional operation 960, the flow in method 900 proceeds to the end oval.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A method comprising:
   receiving data from a device separate from a waste receptacle, the data comprising at least a first amount of a first type of waste;
   comparing the data with a profile including historical waste data from a location;
   sending notifications to the device based on the comparing operation, the notifications including information relating to the data and the profile, the device configured to communicate the notifications to a user;
   receiving first goals from the device; and
   determining second goals based on community waste averages;
   wherein the profile further includes the first goals and the second goals;
   wherein the historical waste data includes a daily average, and the comparing operation includes comparing the data and the daily average; and
   wherein the notifications further includes amounts of different types of waste generated.

2. The method of claim 1, wherein:
   the comparing comprises comparing the first amount to the first goal, the notifications including information tracking a first progress towards the first goal;
   the comparing further comprises comparing the first amount to the second goal, the notifications including information tracking a second progress towards the second goal; and
   the notifications include at least one of positive feedback prompts for waste reduction and awards for waste reduction.

3. The method of claim 2, further comprising classifying the waste based on statistical analysis models prior to sending the notifications to the device.

4. The method of claim 2, further comprising sending the notifications to an application running on a mobile device of the user, the notifications providing the user with information relating to a first comparison of the first amount and a community waste metric, and a second comparison of a daily average of the location and a community daily average.

5. The method of claim 1, further comprising:
   sending recommendations to the device based at least in part on the data and the profile, the device being configured to communicate the notifications and the recommendations to the user by at least one of a display, a speaker, and a wireless connection to a mobile device; and
   sending the notifications to an application running on a mobile device of the user.

6. A device comprising:
   at least one sensor, the at least one sensor configured to determine properties of waste;
   a processor configured to receive measurement data from the at least one sensor and configured to analyze the measurement data; and
   at least one of a display, a speaker, and a wireless connection to a mobile device configured to provide information to a user, the information being based on the measurement data obtained from the at least one sensor;
   wherein the processor is further configured to classify the waste based on statistical analysis models; and
   wherein the notification further includes amounts of different types of waste generated.

7. The device of claim 6, wherein the notification comprises categorization notifications, the categorization notifications indicating whether waste logged by the device is one of:
   properly placed wholly or partially in another receptacle; and
   compostable.

8. The device of claim 6, wherein the device is configured to transmit to a remote server at least one of:
   the measurement data from the at least one sensor; and
   a result from the processor analyzing the measurement data.

9. The device of claim 6, wherein the at least one sensor is configured to continuously capture the measurement data and is at least one of:
   a weight sensor;
   a computer vision imaging sensor;
   a visual sensor;
   an ultrasonic sensor; and
   a chemical sensor.

10. The device of claim 9, wherein the at least one sensor is the computer vision imaging sensor, and the computing vision imaging sensor includes a processor running an artificial intelligence trained on further measurement data obtained from at least one further sensor.

11. A system comprising:
a receiving module configured to receive data from a location, the data being obtained from a sensor measuring a first amount of a first type of waste;
a processor configured to receive the data from the receiving module and process the data; and
a sending module configured to send notifications to a user device, the notifications including information relating to the first amount, the user device configured to display the notifications to a user;
wherein the processor is further configured to classify the waste based on statistical analysis models; and
wherein the notification further includes amounts of different types of waste generated.

12. The system of claim 11, wherein:
the data are measurements of the waste, the measurements being at least one of a weight, a volume, and a composition; and
the processor determines amounts of different types of waste generated.

13. The system of claim 12, wherein the processor is further configured to update a machine learning model for identifying the different types of waste generated based on the measurements.

14. The system of claim 11, wherein:
the receiving module is configured to receive second data from a second location, the second data being obtained from a second sensor measuring a second amount of the first type of waste;
the processor is configured to receive the second data from the receiving module and process the second data and compare the first data and the second data; and
the sending module is configured to send second notifications to a second user device, the second notifications including further information relating to the second amount, the second user device configured to display the second notifications to a second user;
wherein the notification further includes a first comparison of the first amount and a community waste metric, and a second comparison of a daily average of the location and a community daily average.

15. The system of claim 14, wherein the notification further includes at least one of an award and an indication of community support.

* * * * *